(12) United States Patent
Adams

(10) Patent No.: US 6,986,416 B1
(45) Date of Patent: Jan. 17, 2006

(54) BULK VENDING MACHINE SALES MONITORING APPARATUS AND METHOD

(75) Inventor: Christopher E. Adams, Bellmore, NY (US)

(73) Assignee: American Coin Merchandising, Inc., Louisville, CO (US)

( * ) Notice: Subject to any disclaimer, the term of this patent is extended or adjusted under 35 U.S.C. 154(b) by 150 days.

(21) Appl. No.: 10/683,514

(22) Filed: Oct. 9, 2003

Related U.S. Application Data

(63) Continuation-in-part of application No. 10/458,576, filed on Jun. 9, 2003.

(60) Provisional application No. 60/388,076, filed on Jun. 11, 2002.

(51) Int. Cl.
*G07F 1/00* (2006.01)

(52) U.S. Cl. ...................... 194/344; 194/202

(58) Field of Classification Search ............... 194/344, 194/202, 204, 350, 351, 200; 453/18, 49, 453/59; 221/4
See application file for complete search history.

(56) References Cited

U.S. PATENT DOCUMENTS

| | | | |
|---|---|---|---|
| 3,669,235 A * | 6/1972 | Breeden | 194/200 |
| 3,894,220 A * | 7/1975 | Levasseur | 700/232 |
| 4,031,991 A | 6/1977 | Malott | |
| 4,359,147 A * | 11/1982 | Levasseur | 194/200 |
| 4,741,426 A | 5/1988 | Koch | |
| 4,976,346 A | 12/1990 | Juds et al. | |
| 5,091,713 A | 2/1992 | Horne et al. | |
| 5,109,972 A | 5/1992 | Van Horn et al. | |
| 5,267,171 A | 11/1993 | Suzuki et al. | |
| 5,339,937 A | 8/1994 | Bolen | |
| 5,442,348 A | 8/1995 | Mushell | |
| 5,909,795 A | 6/1999 | Porco | |
| 5,930,771 A | 7/1999 | Stapp | |
| 5,950,794 A | 9/1999 | Porco | |
| 5,963,452 A | 10/1999 | Etoh et al. | |
| 6,050,385 A * | 4/2000 | Nikolayev et al. | 194/202 |
| 6,062,370 A | 5/2000 | Nikolayev | |
| 6,290,049 B1 | 9/2001 | Nikolayev | |

\* cited by examiner

*Primary Examiner*—Donald P. Walsh
*Assistant Examiner*—Mark Beauchaine
(74) *Attorney, Agent, or Firm*—Perkins Coie LLP

(57) ABSTRACT

Apparatus and methods for securely monitoring the sales transactions in bulk vending machines are disclosed, the apparatus operable with at least one bulk vending machine having a coin mechanism that conventionally includes a coin plate, a selectively rotatable handle having a shaft extending radially therefrom, and a coin shuttle. The apparatus of this invention includes a lobe bearing cam mountable at the shaft and an adapter/sensor having first and second switches and an output interface mounted thereon, the switches oriented relative to one another so that the maximum amount of normal backlash (reverse rotation) of the coin plate during vending is accommodated (is less than the angular spread between the switches). The apparatus further includes a microprocessor connectable with the switches through the output interface for counting and recording sales indicated by activation of both of the switches in order, and circuitry for identifying occurrences of apparatus tampering or fault.

30 Claims, 12 Drawing Sheets

US 6,986,416 B1

BULK VENDING MACHINE SALES MONITORING APPARATUS AND METHOD

RELATED APPLICATION

This application is a continuation-in-part of U.S. patent application Ser. No. 10/458,576 filed on Jun. 9, 2003 (claiming the benefit of U.S. provisional patent application Ser. No. 60/388,076 filed on Jun. 11, 2002) and entitled "An Apparatus and Method for Securely Monitoring the Sales Transactions of Bulk Vending Machines".

FIELD OF THE INVENTION

This invention relates to bulk vending machines, and, more particularly, relates devices and methods for recording and/or monitoring sales transactions of bulk vending machines.

BACKGROUND OF THE INVENTION

A variety of vending machines, including bulk vending machines, are known and used. Vending machines normally give a customer the opportunity to select from a variety of items such as chips, candy, pretzels, gum, soda and the like. Bulk vending machines, however, normally hold large quantities of a particular product and do not give a customer a choice between goods (i.e., vend only a single product). Both machine types typically include means for coin operation.

Bulk vending machines are used for the automatic dispensing of a wide variety of products, such as gum balls, nuts and candy. These vending machines come in different shapes and sizes, and are typically fitted with a clear glass or plastic compartment which retains the bulk product to be vended. The typical bulk vending machine also has a coin acceptor and actuating mechanism for the receipt of payment and initiating discharge of product. Plural bulk vending machines are often cited together in a single location, and may even be provided from the manufacturer in a multi-machine access/display assembly.

In operation, the customer places a coin or coins into the coin mechanism of the bulk vending machine and turns a handle (or knob) on the machine, whereby one or a handful of product (depending upon product) in the machine are dispensed down a chute for receipt by the customer. Received coins are stored in a storage compartment where the coins remain until retrieved by an operator.

Bulk vending machines transact one sale at a time at a set price. An owner/operator of the machine is required periodically to maintain and restock the machine and collect the money therefrom, typically manually recording collections from and product resupplied to each machine to thereby maintain a record of sales performance of each of the individual machines. Furthermore, bulk vending machines tend to be sited in remote locations to provide for the sale of merchandise at all hours, without requiring the presence of a sales person. This means that they are often subject to vandalism and/or tampering by users.

The process of monitoring inventory, and calculating, tracking and recording the total revenues for each machine in each location is tedious, time-consuming, subject to both human error and fraud, and has heretofore provided substantially less than a perfectly accurate measure of sales performance. Since many establishments where a bulk vending machine or machines are sited receive a percentage of the revenues collected from each machine, accuracy of the sales performance and documentation of sales is important to an owner/operator of the bulk vending machines sited thereat. Moreover, since owner/operators often utilize independent route personnel for maintenance and collections in a given territory, and/or since other times coll ctions are overseen by managers of the business hosting the sited machine or machines, having independent verification and/or documentation that is secure from manipulation would be advantageous for the owner/operator.

As a partial solution to the foregoing, some vending machines can be purchased or otherwise equipped with a counter to count vending transactions. Where thus equipped, the owner/operator can compare the accumulated count from the counter with receipts collected by contractors, employees or site-based management from time to time (i.e., by going to the machine and independently auditing the count reported on the counter) to ascertain the accuracy of fund collection and reporting. Heretofore known counters for bulk vending machines are easily temporarily disconnected, however, and have been subject to inaccuracy caused by machine user tampering and/or vandalism.

Devices have been heretofore suggested and/or utilized to detect and/or minimize user tampering and/or fraud associated with vending machine sales (see U.S. Pat. Nos. 4,741, 426, 5,339,937, and 4,976,346, for example). Moreover, devices and systems for monitoring sales activity and inventory of vending machines have also been heretofore suggested and/or utilized (see U.S. Pat. Nos. 5,091,713, 5,930, 771, 5,267,171, and 5,963,452, for example). Many such heretofore known systems, however, are not well adapted for use with bulk vending machines, have been directed to addressing only one aspect of the problem (merely detecting use of improper coinage in vending machines, record keeping, remote monitoring, or disconnection of counters for example), and/or are unduly expensive and complex.

One heretofore suggested device (see U.S. Pat. No. 6,050, 385) provides a bulk vending machine coin mechanism together with a counter. The mechanism/counter combination is designed to be received into a standard coin mechanism receiving structure in the bulk vending machine. The counter includes a numeric display and a contact switch assembly wherein first and second spaced apart wires are contactable by a conductive element rotatable with the coin mechanism at different locations along the arc of rotation of the coin mechanism during a vending operation. The first wire pair is connected with the display and the second wire pair is connected with a capacitor thereby to count an occurrence of vending and disenable another count until after a charge/discharge cycle of the capacitor. In this way, double counts during a single vending operation are typically avoided.

However, such heretofore known coin mechanism/counter combination records a vend occurrence at the initial rotation of the coin mechanism when the coin is first inserted. No validation vend sequence is provided. Furthermore, the capacitor can be charged by means other than by the wire pair contacts alone. In addition, the duration for which the wire pairs are in connection, and the condition of the wire pair contacts, can effect charging of the capacitor to different degrees. Thus, by "jiggling" the dispensing knob of the machine, contact between wire pair contacts can occur more than once in a given vend cycle thereby causing the counter to be able to erroneously record multiple vends. If the conductive element is moved too quickly by the capacitor discharge wire pair, thus minimizing contact therebetween, the capacitor may remain partially charged. In such case, when cycled to the next vend, a failure to record the subsequent vend may occur since a charge/discharge cycle may not occur. Further improvement is thus justified.

SUMMARY OF THE INVENTION

This invention provides apparatus and methods for bulk vending machine sales monitoring that provide readily verifiable, precise and accurate recording of revenues generate by a bulk vending machine and held in the vending machine storage compartment since the last service, while also preventing fraud by both the user of the machine and employees/contractors of the owner/operator. The apparatus records the number of coins inserted and the number of actual real time vends made by the bulk vending machine over a selected duration, and is configured to allow automatic retrieval of sales data from the bulk vending machine in a manner that prevents tampering with either the actual vends data or the revenue generated data (coins received). The apparatus may be installed in a bulk vending machine post production or during production with a minimum of coin receiving and vend actuating mechanism modification.

The apparatus of this invention is adapted for use in a bulk vending machine having a coin shuttle connected to a rotatable shaft, and includes a cam having a single cam lobe adapted to be fit on the shaft. First and second switches are positioned relative to the cam thus fit so that the switches are spaced angularly apart a distance greater than maximum backlash allowed at the coin shuttle, and for contact by the cam lobe during rotation thereof. A communication interface receives signal from each of the switches independently, thereby allowing monitoring of the open and closed states thereof. A verified vend at the bulk vending machine is only indicated upon monitored actuation of each of the switches in order responsive to contact by the cam lobe.

The switches are mounted at an adapter/sensor secureable in the bulk vending machine and including a mounting surface having a shaft accommodating opening located therein. The first switch (a vend switch) and the second switch (a clear switch) are both biased open and located at the mounting surface adjacent to the opening so that contact of the vend switch followed by contact of the clear switch by the lobe of the cam is assured during normal cam rotation to thereby selectively close the switches upon lobe contact. The interface is also located at the mounting surface and connected with each of the switches at separate signal output nodes. A processing unit is located to receive output from the separate signal output nodes and responsive thereto determining and verifying the occurrence of a valid vend at a bulk vending machine.

The method for monitoring sales transactions of a bulk vending machine of this invention provides for positioning the cam on the shaft and locating the switches fixedly relative to the cam for contact thereof by the cam lobe upon rotation thereof. The swithches are positioned relative to one another so that maximum normal backlash of the coin mechanism is less than angular spread of the switches, and are communicatingly connected for output of signals therefrom independently of one another.

The method further includes the steps of receiving a first signal indicative of a first phase of a vend cycle invoked at a monitored bulk vending machine, receiving an unrelated separate first signal indicative of a second phase of the vend cycle, and distinguishing between actual signals indicative of the first and second phases and erroneous signals. Irrespective of additional signals received, a verified vend is acknowledged during the vend cycle only after receipt of the first signal indicative of a first phase followed by the separate first signal indicative of a second phase. Thereafter, a resetting prepares for another vend cycle.

It is therefore an object of this invention to provide improved apparatus and methods for bulk vending machine sales and revenue monitoring.

It is another object of this invention to provide apparatus and methods for bulk vending machine sales monitoring that provide readily verifiable, precise and accurate recording of revenues generated while also preventing fraud by users and/or employees/contractors of the owner/operator.

It is another object of this invention to provide apparatus and methods for bulk vending machine sales monitoring that achieve recordation of the number of coins inserted and the number of actual real time vends made by the bulk vending machine over a selected duration, and allow automatic retrieval of sales data from the bulk vending machine in a manner that prevents tampering with either the actual vends data or the revenue generated data.

It is another object of this invention to provide apparatus for bulk vending machine sales monitoring that may be installed in a bulk vending machine post production or during production with a minimum of coin receiving and vend actuating mechanism modification.

It is still another object of this invention to provide an apparatus for monitoring sales by a bulk vending machine, the machine having a coin shuttle connected to a rotatable shaft, the apparatus including a cam having a single cam lobe thereat and connectable at the shaft for rotation therewith, first and second switches fixedly positionable relative to the cam so that the switches are spaced angularly apart a distance greater than maximum backlash allowed at the coin shuttle and for contact by the cam lobe during rotation thereof, and means for establishing signal communication from each of the first and second switches independently to thereby allow monitoring of the open and closed states thereof, whereby a verified vend at the bulk vending machine is only indicated upon monitored actuation of each of the switches in order responsive to contact by the cam lobe.

It is yet another object of this invention to provide a bulk vending machine sales monitoring apparatus including a shaft mountable cam having only a single lobe thereat, an adapter/sensor positionable in the bulk vending machine and having a mounting surface with a shaft accommodating opening located therein, a vend switch and clear switch each biased open and located at the mounting surface adjacent to the opening so that contact of the vend switch followed by contact of the clear switch by the lobe of the cam is assured during normal cam rotation to thereby selectively close the switches upon lobe contact, and an output interface located at the mounting surface and connected with each of the switches, the output interface providing separate signal output nodes for the vend switch and the clear switch, and a processing unit for receiving output from the separate signal output nodes and responsive thereto determining and verifying the occurrence of a valid vend at a bulk vending machine having the apparatus installed therewith based on activity first at the vend switch followed by activity at the clear switch.

It is still another object of this invention to provide a method for monitoring sales transactions of a bulk vending machine having a rotatable shaft extending radially from a coin shuttle, the method including the steps of positioning a cam having a single cam lobe thereat on the shaft, locating first and second switches fixedly relative to the cam for contact thereof by the cam lobe upon rotation thereof, and positioning the switches relative to one another so that maximum normal backlash of the coin mechanism is less than angular spread of the switches, and communicatingly connecting the first and second switches for output of signals therefrom independently of one another.

It is yet another object of this invention to provide a method for monitoring sales related activity of a bulk vending machine that includes the steps of receiving a first signal indicative of a first phase of a vend cycle invoked at a monitored bulk vending machine, receiving an unrelated separate first signal indicative of a second phase of the vend cycle, distinguishing between actual signals indicative of the first and second phases and erroneous signals, and, irrespective of additional signals received, acknowledging a verified vend during the vend cycle only after receipt of the first signal indicative of a first phase followed by the separate first signal indicative of a second phase, thereafter resetting in preparation for another vend cycle.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
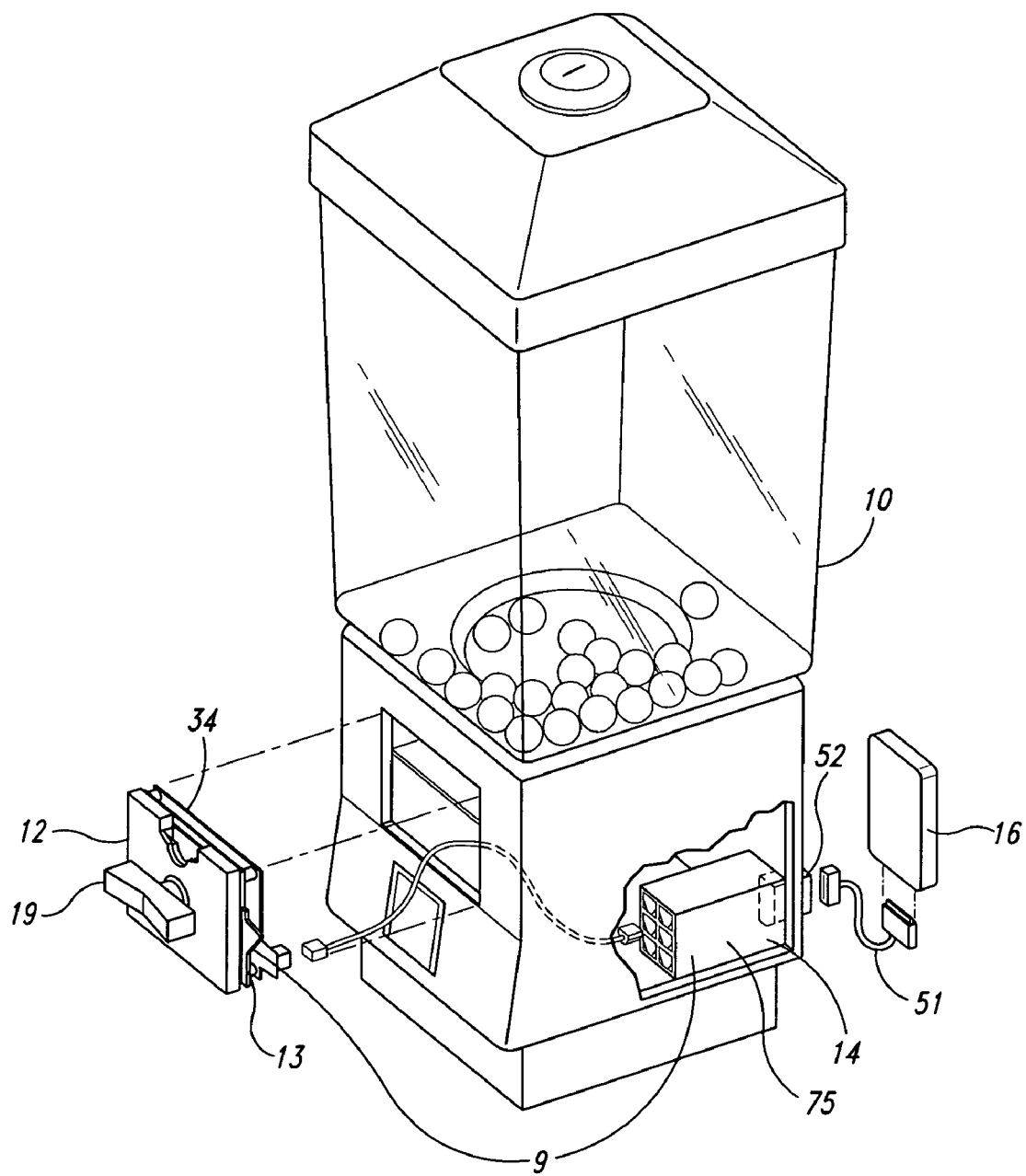
FIG. 1 is a perspective view showing the apparatus of this invention installed at a bulk vending machine.
Figure 2:
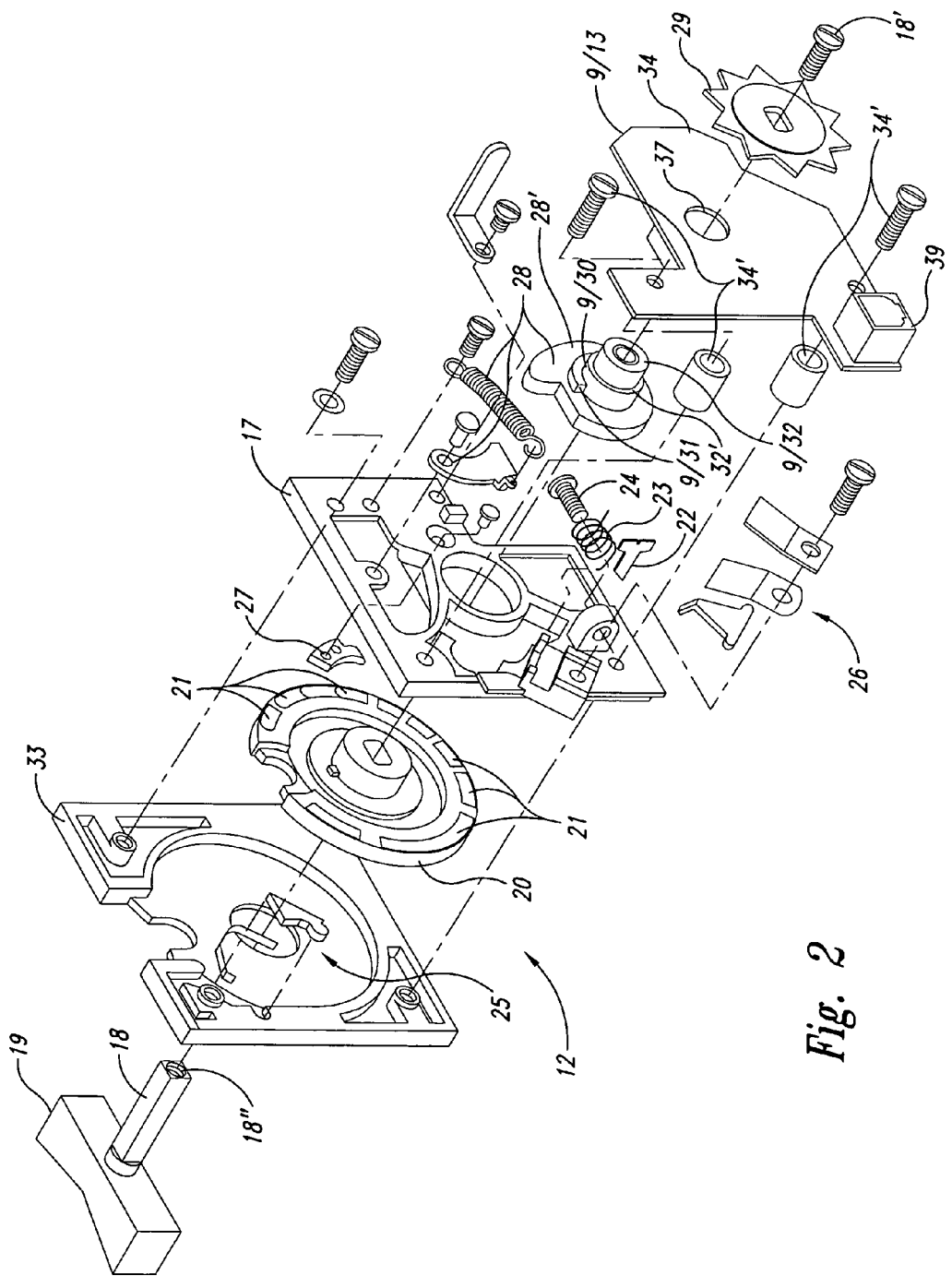
FIG. 2 is an exploded view of the coin mechanism adapter/sensor portion of the apparatus of this invention positioned with the coin receiving and vend actuating mechanism.

There is shown in FIG. 1 apparatus 9 for monitoring the sales transactions of a bulk vending machine 10. Vending machine 10 includes coin receiving and vend actuating mechanism 12 having adapter/sensor 13 of apparatus 9 of this invention mounted therewith and in communication with processing unit 14 of apparatus 9 of this invention (which may be either remotely programmable or essentially non-programmable). Portable reader 16 (a PALM hand held computer unit for example) may be placed in communication with processing unit 14, for retrieval and interpolation of all the sales data contained within the microprocessor of processing unit 14 as a result of the vends recorded therein (i.e., total revenues, product activity and inventory, for example). Some readers 16 may be configured to be capable of generally only retrieving data from the microprocessor (i.e., not capable of writing to the microprocessor or selecting or altering stored data).

Mechanism 12 as illustrated herein is one of the standard such units known in the industry (other configurations of mechanism 12 are known and could as easily be adapted for use with the apparatus of this invention) and is conventionally assembled as described hereinbelow except as noted to allow positioning of adapter/sensor (a circuit mounted, etched or otherwise formed on a plate or card) 13 thereat. Mechanism 12 includes a coin plate 17, shaft 18, handle (a user accessible knob) 19, coin shuttle 20 having ratchet teeth 21 described annularly therearound, and pawl 22 engagable with teeth 21 and biased toward engagement at shuttle 20 by spring 23 mounted on spring mount 24. Spring biased cam assembly 25 prevents rotation of coin shuttle 20 absent coin insertion, positioner assembly 26 assures proper coin position in shuttle 20, and coin stripper 27 strips a coin from shuttle 20 (whereupon the coin drops to a storage compartment for later retrieval). Spring biased shaft positioning cam assembly 28 assures (together with ratchet and pawl combination 21/22) proper location of shaft 18, and thus coin shuttle 20, after each vend. Star wheel 29 is conventionally engageable to actuate distribution of product at a vending chute when rotated by shaft 18.

Turning now to the apparatus of this invention, apparatus 9 includes cam 30 bearing a lobe 31, mounted abutting flange 32' of bushing 32, over shaft 18, with bushing 32 maintained through a selectively positioned opening at adapter/sensor 13. Bushing 32 is press fit in the adapter/sensor opening with flange 32' abutting the back face thereof. Cam 30/lobe 31 may be separate units or integral, and may be formed separately from the cam 28' of cam assembly 28 or manufactured integrally therewith. Shaft 18 is axially located through mechanism 12 and cam 30 (cam 30 having an opening therethrough matching the cross-sectional configuration of shaft 18 to assure close fit and stable rotation of the cam with the shaft), with screw 18' engaging threaded opening 18" at the end of shaft 18 fit through bushing 32 pressed into opening 37 to, in part, secure the elements together and at front plate 33 of mechanism 12. Mounting plate 34 of adapter/sensor plate 13 is also fixedly mounted to coin plate 17 (using screws and spacer combinations 34' securable at front plate 33).

Figure 3:
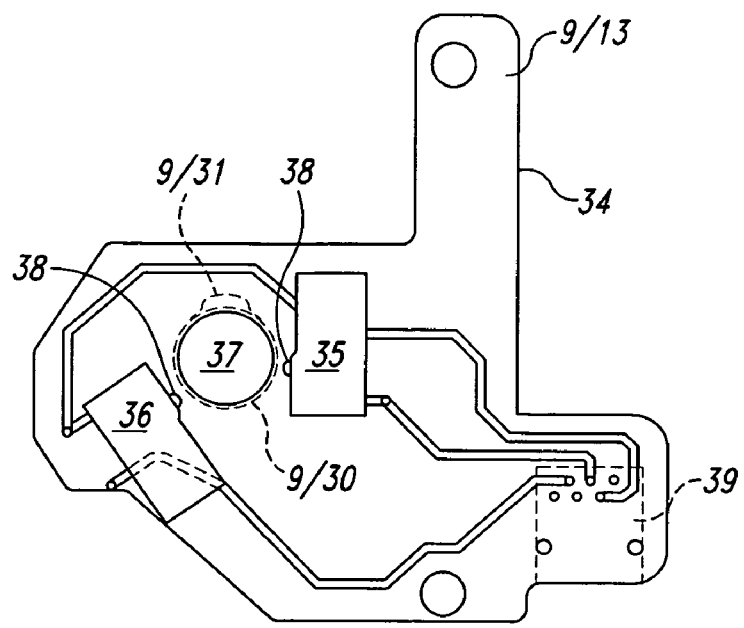
FIG. 3 is a front view of the coin mechanism adapter/sensor portion of the apparatus of this invention.
Figure 4:
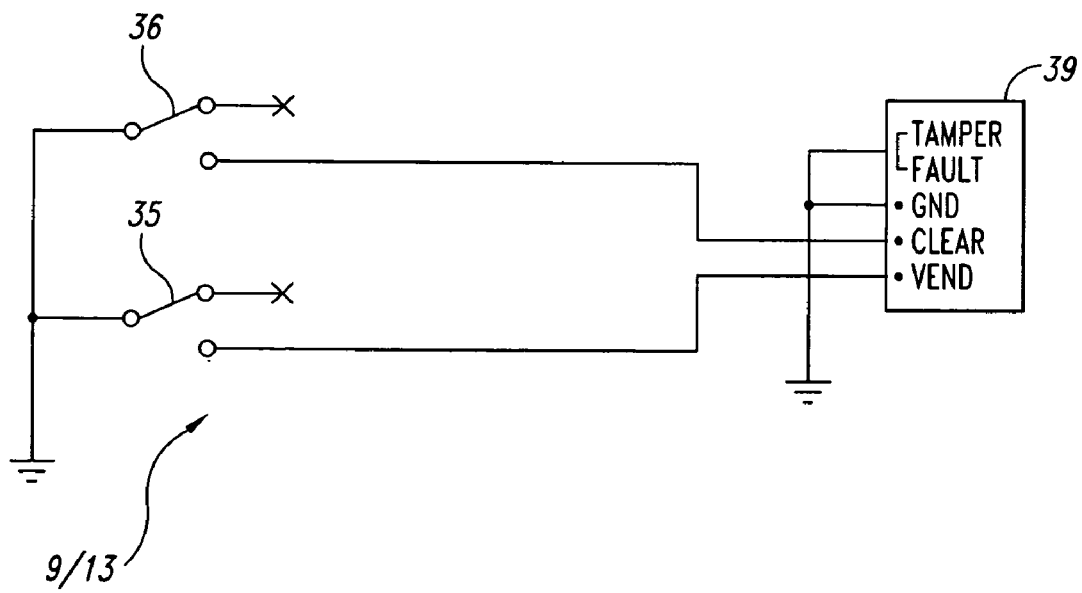
FIG. 4 is schematic diagram of the switching sensor circuit of the apparatus of this invention.
Figure 5A:
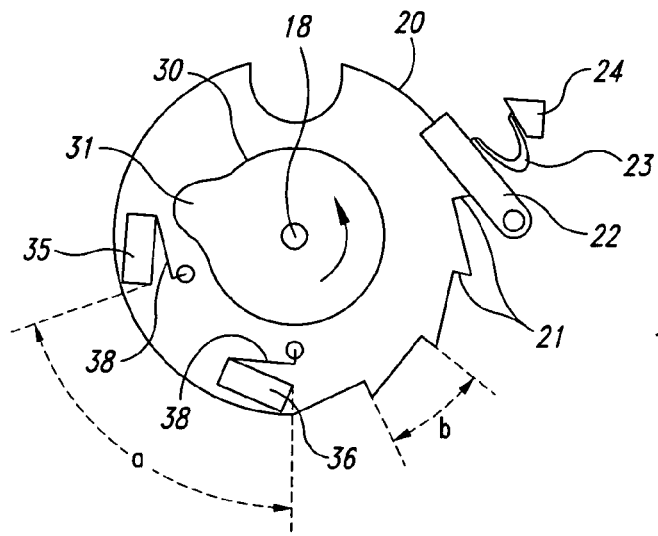
FIGS. 5A through 5E are schematic illustrations showing the method of sensing and communicating a single vend (including coin receipt) in a stepwise fashion.
Figure 5B:
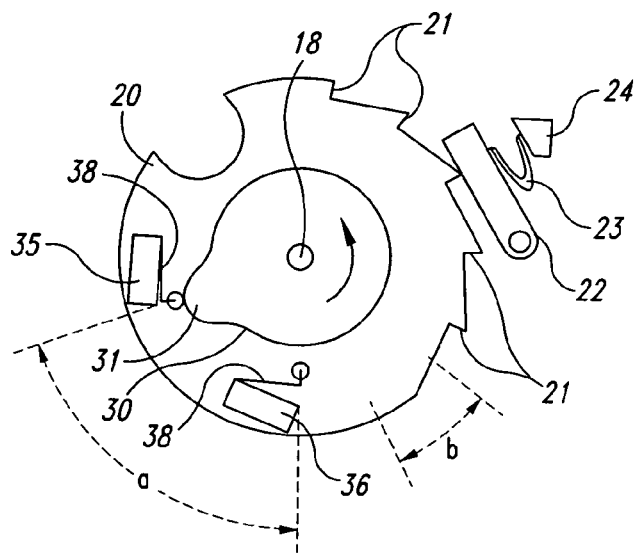
Figure 5C:
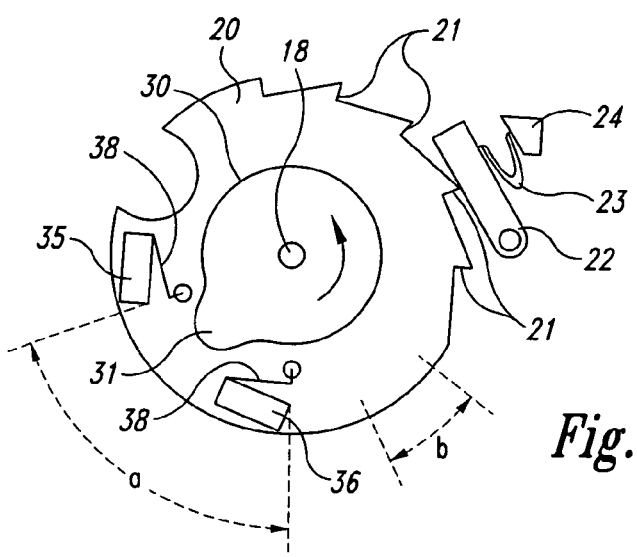
Figure 5D:
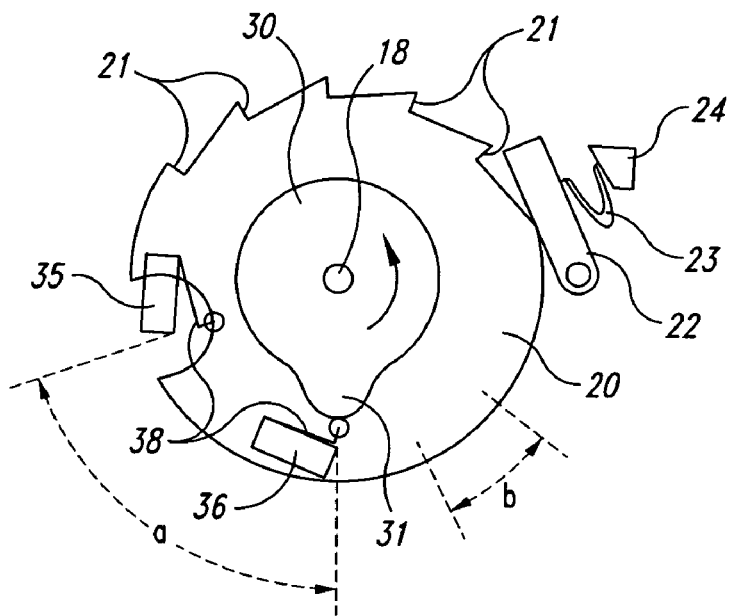
Figure 5E:
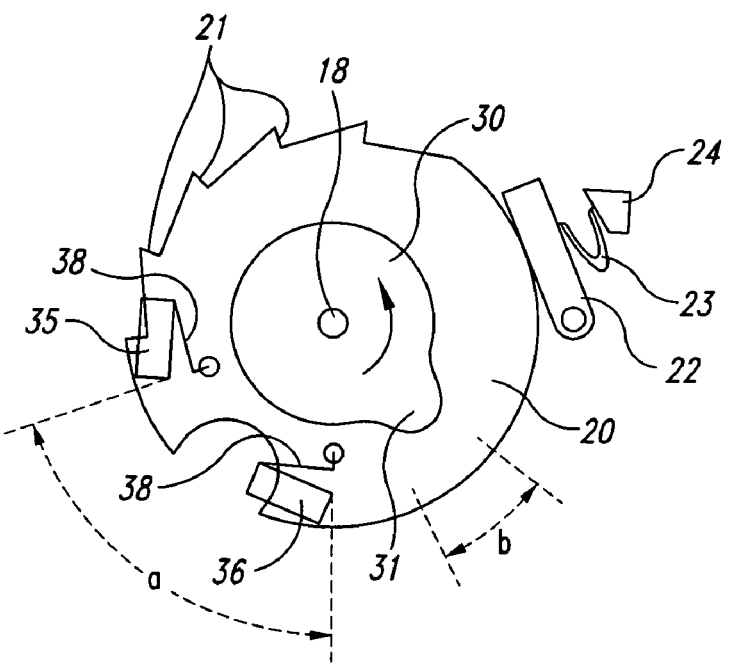

As shown in FIGS. 3 and 4, the vend sensor of this invention includes vend switch 35 and clear switch 36 fixedly mounted relative to opening 37 on adapter/sensor plate 34 (herein a circuit board substrate) of apparatus 9 so that cam lobe 31 of apparatus 9 can contact switch activators 38 as the lobe rotates. Switches 35 and 36 are orient d so that the maximum amount of backlash in the coin mechanism is less than the angular spread ("a" in FIG. 5) of the switch activators 38 (backlash, designated as "b" in FIG. 5, is defined as the allowed reverse rotation of coin shuttle 20 after receipt of a coin and during shuttle forward rotation in the vend cycle, which allowed reverse rotation is in turn defined by the distance between ratchet teeth 21 at the point of switch contact by lobe 31). Finally, adapter/sensor 13 of apparatus 9 also includes output interface 39 connected in the circuit with switches 35 and 36 for communicating switch activity to processing unit 14. Adapter/sensor 13 is configured such that no matter how many times switches 35 and 36 may be activated during a single vend cycle, the microprocessor of processing unit 14 records each vend cycle as a completely single transaction only.

Switches 35 and 36 are simple on/off switches (i.e., passing a signal when closed but breaking the circuit when open). While interface 39 is illustrated herein as a simple four lead telephone-type jack, other outputs could be conceived of including hardwired interfaces, wireless communication interfaces, different types of peripheral interfaces, or the like, so long as separate output nodes for signal from each of the switches 35 and 36 (independent of one another) are provided (see FIG. 4).

Switches 35 and 36 are preferably basic, standard, snap action switches (biased open) commonly available (preferably micro-switches). Such switches have a plunger on top (i.e., a button activator 38) which, when pressed down, makes contact with its contact point. They are designed to have their own positive method of making contact. Such contact is driven and achieved with an applied force for a number of reasons, for example for self cleaning purposes (since every time the contact is made with positive force the tarnish accumulated thereon is removed for a positive connection, for much better positive connection, and/or for easy replacement and maintenance (as switches of this type have a fixed life cycle built into them making it easy to know when they need to be replaced).

With reference to FIGS. 3 through 5, vend switch 35 and clear switch 36 are in communication through output interface 39 with processing unit 14 so that every coin inserted and deposited into coin mechanism 12, and thus every sale made as a result of such coin deposit, is recorded by the microprocessor of processing unit 14 as a single vend. Switches 35 and 36 are oriented on plate 34 around opening 37 so that the maximum amount of backlash "b" in operation of coin mechanism 12 is less than the angular spread "a" of switch activators 38. This insures that the cam-borne lobe 31 can only strike vend switch 45 first and then clear switch 36 second during normal operation of mechanism 12, and that at no time can both switches 35 and 36 be activated at the same time or in reverse order. Thus, when a coin is inserted into mechanism 12 and switch 35 is activated (by rotation of shaft 18 by a user), no matter how many times vend switch 35 is activated during a single vend cycle (360° of rotation of shaft 18) due to backlash "b", only one contact is recorded in that cycle as a sale. When cam lobe 31 contacts clear switch 36, it is activated and only then is apparatus 9 reset and ready for the next coin count. Similarly, no matter how many times clear switch 36 is activated during a single vend cycle due to backlash "b", only one contact is effective for sale recordation in that cycle. For purposes of sale recording at processing unit 14, a completed vend cycle consists of a vend switch 35 closure coupled with a clear switch 36 closure (in order). This in the only combination that will be recorded at processing unit 14 as a "vend" or sale.

As can be seen from FIGS. 5A through 5E (also viewed from back to front, and wherein all elements depicted are schematically illustrated for simplicity), the method of signal coordination from adapter/sensor 13 for computing and recording a single vend comprises multiple phases. The first phase includes the steps of inserting a coin into coin mechanism 12 of bulk vending machine 10 and using handle 19 of mechanism 12 to rotate shaft 18 and thus coin shuttle 20 and lobe-bearing cam 30 toward vend switch 35 (FIG. 5A), such that it results in contact by lobe 31 with activator 38 of switch 35 causing the switch to close (FIG. 5B), and thereby communicating a signal from interface 39 to processing unit 14 placing unit 14 on alert starting a vend validation sequence as discussed hereinafter. In general, a vend validation sequence includes the detection of closed vend switch 35 and commencement of a timing phase of the sequence simultaneously with the monitoring of the status of vend switch 35. At the end of a first duration (i.e., after a first preset duration), the processing unit confirms the status of vend switch 35 and either declares an error and allows the processing to go back to an idle mode if vend switch 35 is open, or, if vend switch 35 is still closed, proceeds to a wait state waiting for vend switch 35 to open. During this first timing phase, processing repeatedly checks the status of vend switch 35 over a selected period of time (for example, three to six milliseconds). If at the end of that time it has repeatedly confirmed that the vend switch is in fact still closed, then processing recognizes a valid vend event and proceeds to the next phase of operation. At no time during this initial phase of operation is a vend recorded at processing unit 14.

In the next phase of operation, rotation of coin shuttle 20 continues resulting in the movement of lobe 31 off vend switch 35 activator 38 causing switch 35 to open (FIG. 5C) allowing the registering of the open vend switch by processing and causing processing to proceed to a wait state waiting for activation of clear switch 36. At this time both vend switch 35 and clear switch 36 are open. Lobe 31 of cam 30 is between switches and processing is waiting for a new event (because it believes that it is in a partial vend). It is actively waiting for something to happen (i.e., looking for the clear switch signal).

In the next phase of the method: rotation of coin shuttle 20 continues until such time as cam-borne lobe 31 contacts clear switch 36 and causes activator 38 to close the switch (FIG. 5D); closure of clear switch 36 is detected at processing unit 14 via interface 39; such closure is timed (for 3 to 6 milliseconds, for example) to confirms that clear switch 36 is in fact closed; thereafter, status of clear switch 36 via processing is checked; and, responsive thereto, either processing is allowed to go back to waiting for "clear state" if switch 36 is open after the initial short timing period, or, if clear switch 36 is in fact closed, processing is allowed to declare a vend event.

During the timing step of this phase, processing repeatedly check the status of clear switch 36 multiple times over the short period. If, at the end of that time, it has repeatedly confirmed that clear switch 36 is in fact closed, then processing recognizes a valid vend event and proceeds to the next step of the method (incrementing counters associated with the microprocessor of processing unit 14 and proceeding to wait for clear switch 36 to open (FIG. 5E), thus resetting the process. It should be noted that processing does not record a vend event until this validating phase sequence is completed. This prevents the reading of false vends (due, for example, to electrostatic discharge events, normal snap switch bounce, external shock, and the like).

The last phase of the method for recording a single vend event (waiting of clear switch 36 to open) includes: continuing rotation of coin shuttle 20 causing the coin to drop out of mechanism 12 into the coin storage compartment of machine 10 and cam-borne lobe 31 to move off activator 38 of clear switch 36 (FIG. 5E); allowing clear switch 36 to open; detecting the opening of clear switch 36 at processing via interface 39, thus resetting processing unit 14 to a power save/idle state; continuing rotation of shuttle 20 back to its start position (ready for receipt of another coin); and as a result, dispensing product and readying the unit for another vend sequence.

Figure 6:
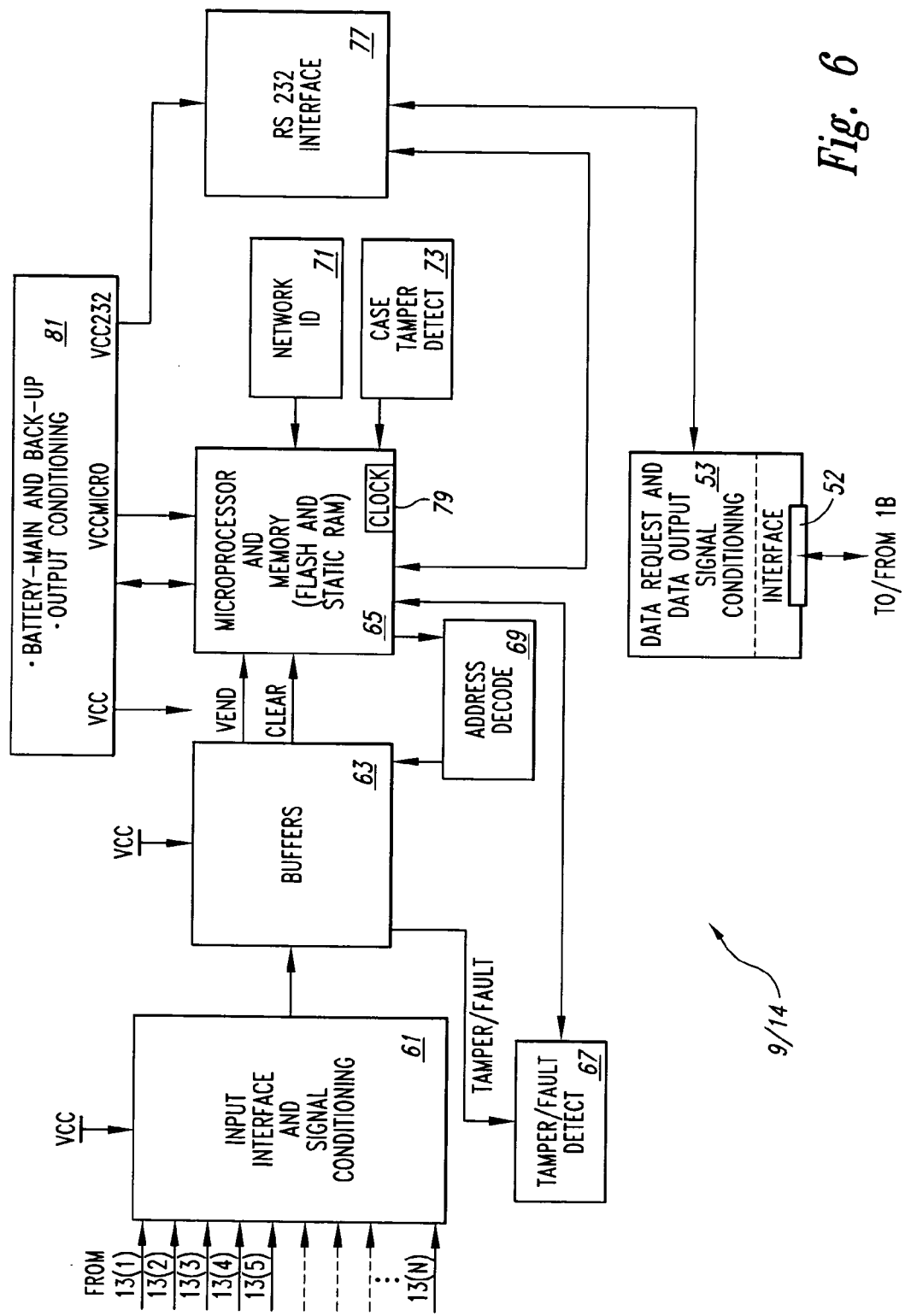
FIG. 6 is a block diagram of the processing unit of the apparatus of this invention.

As can be seen from the foregoing, processing at unit 14 is programmed to receive the number of vends from adapter/sensor 13. Based on the number of vends, processing is able to determine the number of sales transactions and the amount of money actually collected from each bulk vending machine 10 (more than one machine 10 may be connected with a single processing unit 14 as shown in FIG. 6). Analysis of sales data reported from processing unit 14 shows whether inventory sold from the bulk vending machine correlates to revenues collected therefrom and how well the respective items are selling. Absence of such correlation provides indications of tampering, fraud, or machine fault.

A router (an employee or contractor of the owner/operator) maintaining a bulk vending machine 10 thus adapted by the apparatus of this invention uses a portable reader (or PALM) 16 to collect data stored within processing unit 14. As is conventional, reader 16 is provided with any or all of a display, keypad, bar code reader, CPU, memory, a first input communication port (for receipt, for example, of connector cable 51 as shown in FIG. 1), and a power source.

In general, the router places portable reader 16 in communication with processing unit 14 (utilizing cable 51, for example, though other known interfaces may be utilized) and inputs initialization data. The initialization data is basically an identification code for the router or other personnel operating reader 16 (different ID codes may be used for different operators and/or operators having differing levels of access, as would be obvious given the secure nature of the data maintained by the apparatus of this invention as described herein), and, in some cases, an identification code for the location of th particular bulk vending machine 10 being accessed (for example, where a bank of machines 10 are co-located and connected with a single processing unit 14 being accessed by reader 16), an identification code for location of the bulk vending machines within the store, and an identification code for processing unit 14. Under no circumstances can an unauthorized person enter any programming commands that are capable of modifying or altering the information contained and stored in processing unit 14 in connection with total number of vends recorded.

In one embodiment, initialization data is entered using a combination of key pad and bar code technology. The router, store and processing unit 14 have identification tags provides with a bar code identification number. A bar code reader is directed toward a bar code identification number to be input. The CPU of reader 16 verifies that a valid identification code has been entered. Identification codes can be entered by keypad as well.

Upon successful entry of initialization data, and if reader 16 employs the proper protocol, the router continues placing reader 16 in communication with processing unit 14 and enters a command to begin data transmission. In one version of the invention, reader 16 is connected to processing unit 14 for communication via cable 51 connected at one end to communication port 52 (FIG. 1) at signal conditioning/interface 53 (FIG. 6) of processing unit 14 and at the other end to the input communication port of reader 16. Alternative methods of data transmission could be utilized, such as optical or radio frequency signals. The command to begin transmission can be entered via the keypad of reader 16 or a special purpose key or switch.

Upon completion of data transmission from processing unit 14 to reader 16, reader 16 is disconnected from processing unit 14. When desired, reader 16 is placed in communication with a printer, desktop or other computer, tape drive, or the like via its output communication port for transmitting data to another location, storage or hard copy. Processing unit 14 is equipped to detect unauthorized operations attempted by unauthorized entities. Upon detection of such operations, processing unit 14 is locked down to prevent it from transmitting data to a reader 16. Processing unit 14 is unlocked to allow transmission of data only upon receiving an unlock code. A reader 16, while in communication with processing unit 14, is capable of receiving an input unlock code (by keypad entry, for example) which it transmits to processing unit 14. Upon reception of the unlock code transmitted by the reader, validity of the unlock code received is determined, and if valid unit 14 is unlocked to allow transmission of data to the reader 16.

Bench testing and limited field testing have shown that the apparatus and method of this invention are up to 100% accurate. While this system does require some extra wiring to be routed to adapter/sensor 13, it also affords enhanced capabilities (for example, such as sensing whether or not switches 35 and 36 are connected to processing unit 14 or have been compromised, or whether a switch has be active or not for a very long time, as discussed hereinafter). This information in turn can be used to detect tampering, malfunction such a stuck switch, and/or evaluation of product sales.

Turning in more specific detail to processing unit 14 as shown in FIG. 6, processing unit 14 includes an input interface 61 for receiving switch 35/36 signals and tamper or fault signals from adapter/sensors 13 (as shown in FIG. 4, any indication that the circuit has been broken other than at switches 35/36 is sensed at the circuit connected to the tamper/fault output node of interface 39) at each bulk vending machine 10 connected with unit 14 (one through N machines 10 may be accommodated a plural ports, as noted, since many bulk vending machines are located together, often in a factory supplied configuration, or rack). The input interface provides signal conditioning to reduce noise, the actual input ports (jacks or the like) at interface 61 corresponding in nature to the actual output interface 39 utilized at each of the adapter sensors 13.

The conditioned input signals from interface 61 are provided at buffers 63 whereat signals are further conditioned (static removal and the like, for example) to provide clean digital output signals to microprocessor 65 indicative of vend and clear switches 35/36 activity and to tamper/fault detect circuit 67 of tamper and fault signals from adapter/sensors 13. Circuit 67 is coupled with microprocessor 65 so that any tamper/fault indication at any of the adapter/sensors 13 will cause a flag to be set at microprocessor 65 and so that the location, time and date of the fault or tampering (i.e., the specific adapter/sensor 13 generating the tamper/fault signal) can be specifically identified (microprocessor 65 thereafter reacting as discussed hereinbelow to the tamper event).

Address decoder 69 is connected between buffers 63 and microprocessor 65 to switch signal output on all but the vend output line (which signal output flows directly to microprocessor 65 without intervention) responsive to address output signals provided from microprocessor 65. Network ID circuit 71 is installed at the time of unit 14 shipment to a field installation, and provides microprocessor 65 with information regarding the specific configuration of the system installation (number of machines 10 in the installed network and the like).

Case tamper detect circuit 73 is connected to microprocessor 65 and includes a switch mounted at case 75 (FIG. 1) housing processing unit 14 which is triggered if the case is tampered with (opened, for example). Microprocessor 65 stores the date and time of such occurrence and reacts as discussed hereinbelow to the tamper event. RS232 interface 77 is connected between microprocessor 65 and data request and data output signal conditioning/interface 53 (including communication port 52 thereat) for receiving and providing necessary logic level changes to operational output signals and data for presentment at a PALM reader 16, and for receiving and providing necessary logic level changes to data and operational response/request signals from reader 16 to microprocessor 65. Conditioning/interface circuit 53 provides basic input output signal filtering and conditioning.

Microprocessor 65 (for example, an ultra low power mixed signal microprocessor, with 16 bit RISC, having internal flash memory and static RAM, and internal UART communications capability may be utilized) is preferably provided with an internal clock 79. Main and backup power supply 81 provides power signal conditioning and three separate outputs at two different output levels, each active whether main battery or backup battery power is utilized. A relatively high power output (VCC232, a three volt, three to six milliamp output) is provided to RS232 interface 77 to support the higher power requirements of a PALM reader 16. Lower power outputs (VCC and VCCMICRO, 2.4+volt, 10 to 30 microamp outputs) support the remainder of the system. Power supply 81 is configured to preserve low power operation (for long battery life) and seamless switching between main and backup power. Main and backup battery condition is monitored by microprocessor 65.

Figure 7A:
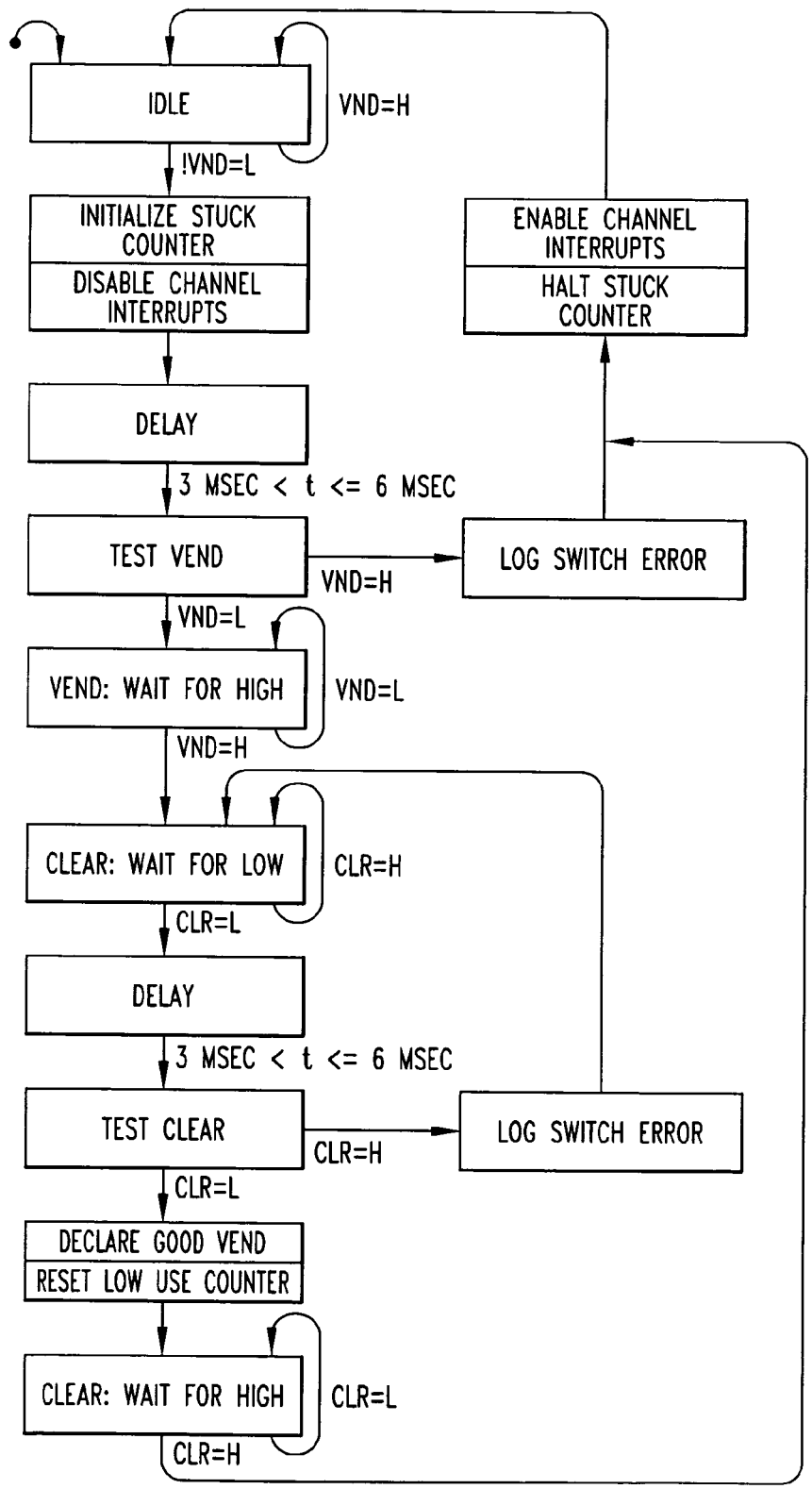
FIGS. 7A through 7F are flow charts illustrating overall function of the apparatus of this invention.

FIGS. 7A through 7F illustrate in greater detail operation of the preferred embodiment of apparatus 9 of this invention. As shown in FIG. 7A, initially microprocessor 65 is in an idle mode waiting for a signal at an incoming vend signal lin to go low (Vnd=L) indicating closure of a switch 35 upon contact with a related cam lobe 31 during a first phase of a vend cycle. A switch stuck counter is initialized and channel interrupts are disabled. A three to 6 millisecond delay is entered testing whether the signal is an error (indicating that the particular vend signal line has gone high during this short duration and that no vend cycle has actually begun at the related machine 10, in which case the error is logged, the stuck counter is halted and channel interrupts are reenabled before the idle mode is reentered), or whether, if the signal remains low, a vend cycle may actually have begun in the related machine 10. Microprocessor 65 then waits for the signal on that line to go high indicating passage of the related cam lobe 31 by the switch 35 thereby opening the switch.

When the vend signal goes high, microprocessor 65 waits for the signal on the clear line related to that vend line to go low, indicating cam lobe 31 contact with the switch 36 during a second phase of the vend cycle. Again this signal is tested for error for a short duration, and if cleared a good vend (i.e., a completed vend cycle at the related machine 10) is logged and a low use counter (a timer of long duration for indicating frequency or rarity of use of the particular machine) is reset. After the particular clear signal again goes low the routine is reset for reentry to idle mode. If during operations, one or the other of switches 35/36 remains low, the stuck counter continues to run and, after a period, sets a flag indicating location of the stuck switch.

Figure 7B:
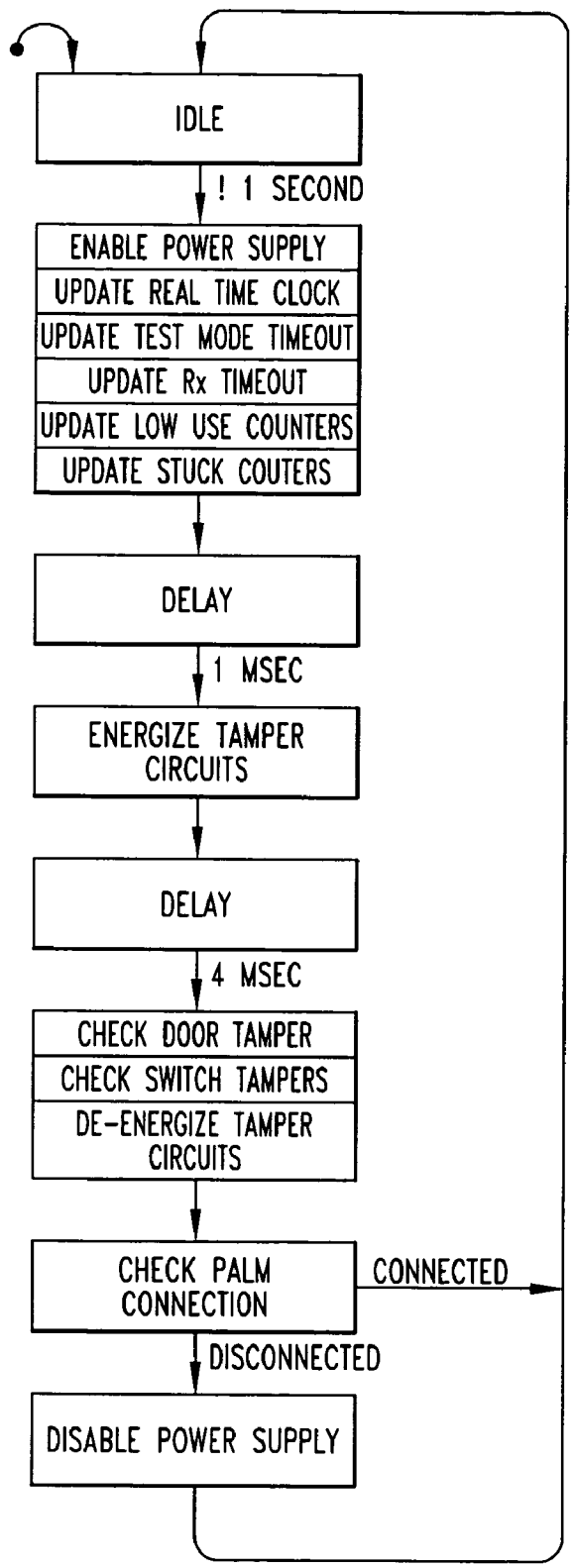
Figure 7C:
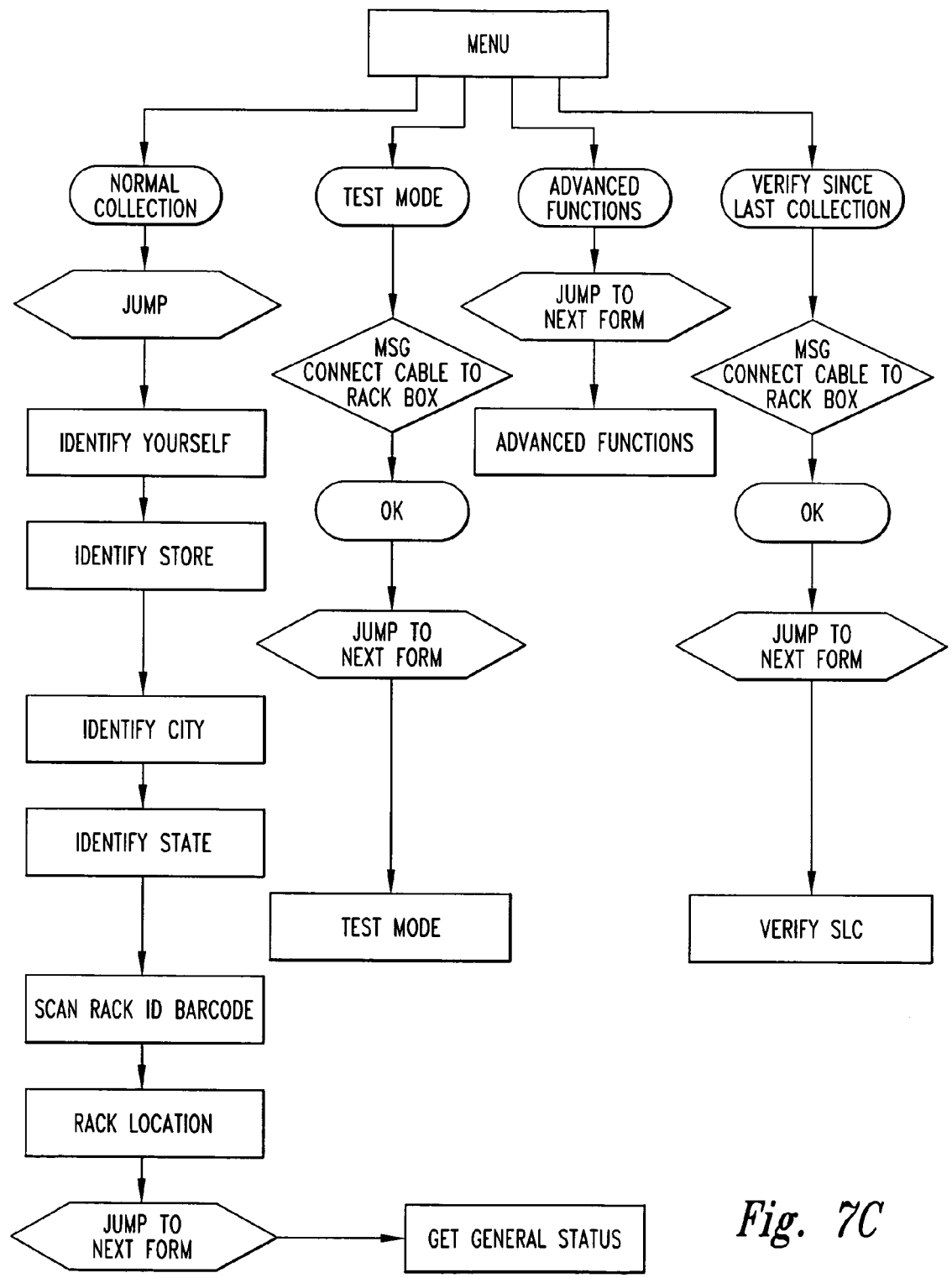
Figure 7D:
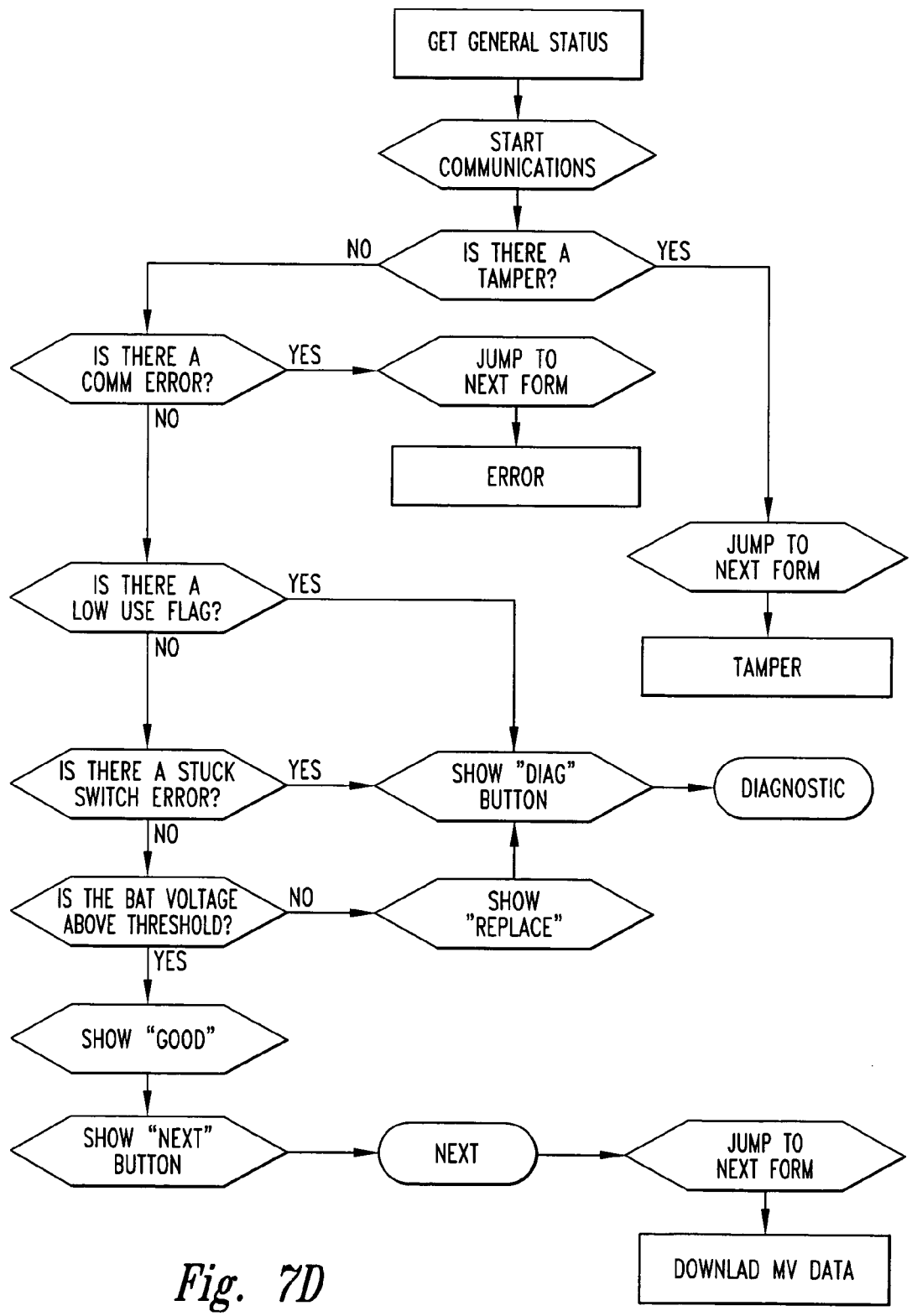
Figure 7E:
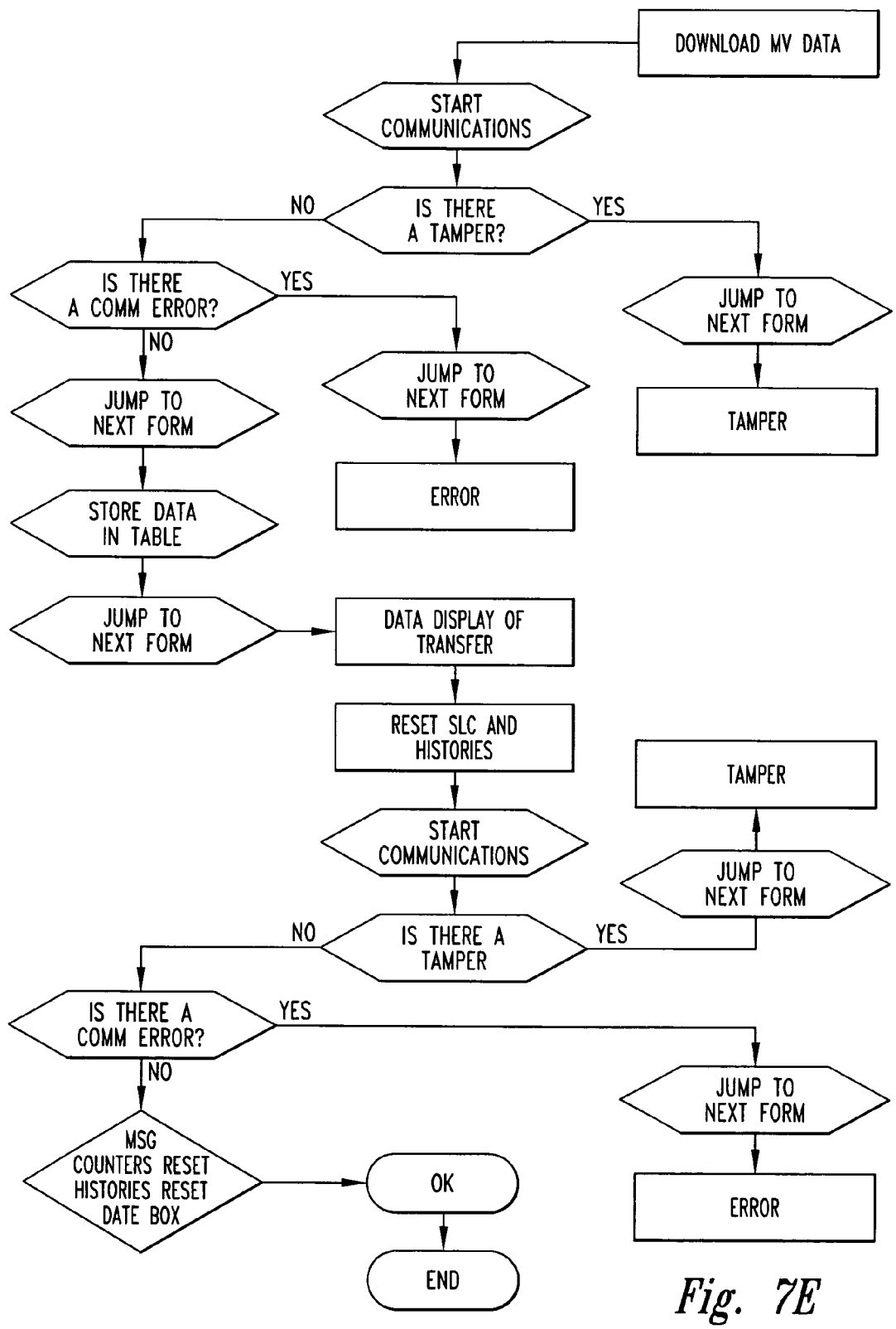
Figure 7F:
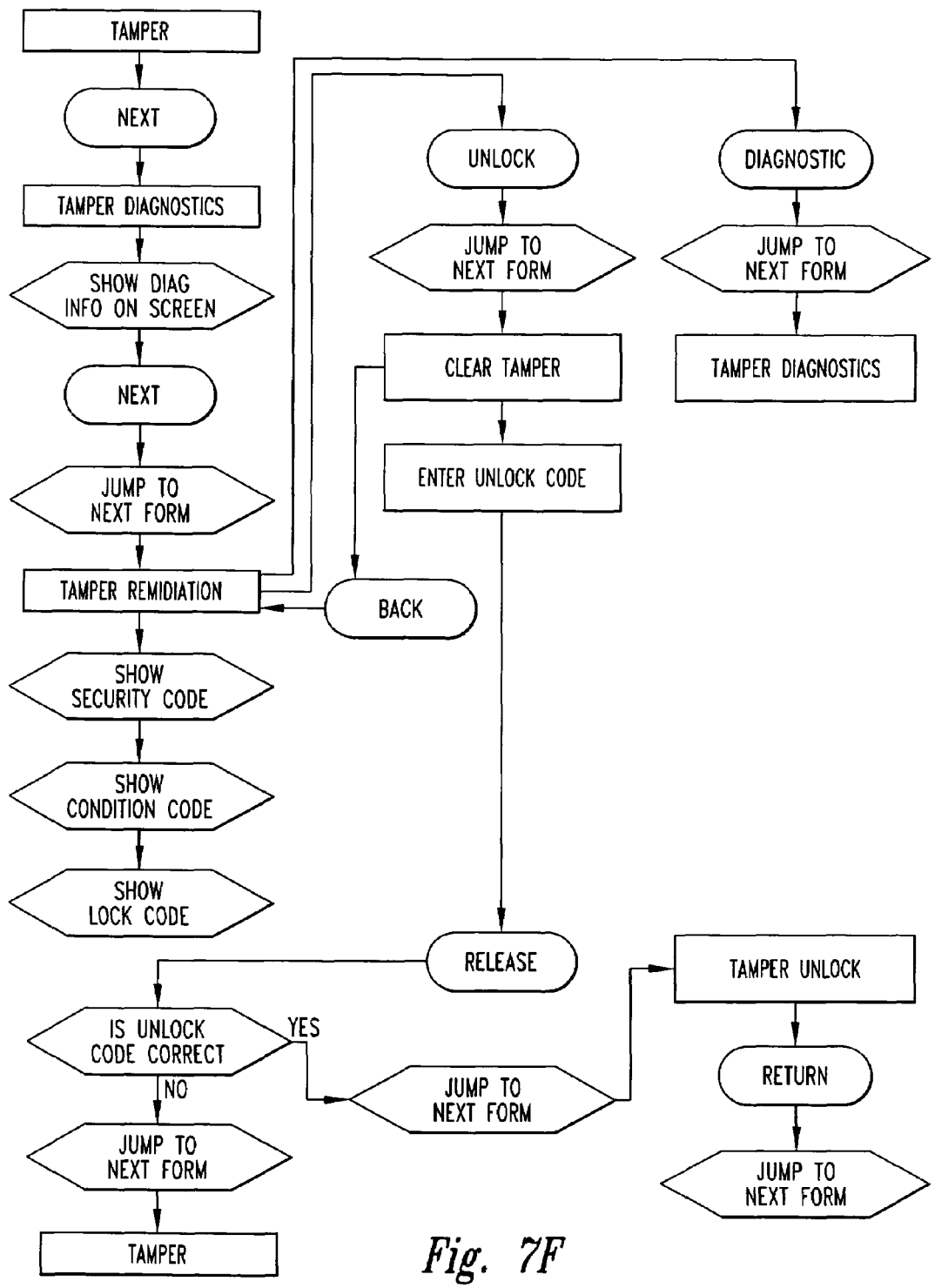

FIG. 7B illustrates overall processing unit 14 system operation, a redundant operation that occurs every second. System operation includes power supply 81 enablement, update of various clocks, timeouts and counters, tamper/fault detection at circuits 67 and 71, and detection of connection of a PAIM reader 16 to unit 14 (if connected the cycle continues without interruption, while if no connection is noted, the system returns to idle mode until completion of the one second cycle time).

FIGS. 7C through 7F illustrate operation of processing unit 14 (firmware and software) after detection of a reader 16 connected thereto (operation of unit 14 as illustrated herein is taken from the vantage point of a reader 16). Upon detection of a connected reader 16, microprocessor 65 may be accessed for various functions by authorized personnel. In test mode, repair and test stand testing are accommodated without incrementing the various coin and vend counters. This operation is timed and processing is automatically reset after a selected duration. The verify routine (SLC—since last collection) provides output indicating that the particular machine 10 accessed is up and running and gives personnel the last date of collection. The advanced functions routine allows properly authorized personnel recognized by unit 14 to set or reset pricing of various product at machines 10.

For normal collections (machines 10 restocking, coin removal, and the like), identification as discussed hereinafter is required (using a bar code reader for example), including preferably user identification, store, city and state identification, and rack and rack location identification. Thereafter, general status of machines 10 can be accessed, microprocessor 65 first reporting any tamper/fault flags from circuits 67 and/or 71 or error events (error events subroutine reports system processing errors and the like and error code number, as is common). Any machine low use flag setting is reported, as are any stuck switch 35/36 flags, and monitored battery condition is noted. If low use, a stuck switch or low battery condition are found, a diagnostic routine may be accessed providing specific information related thereto (for example, locations of a specific machine in the rack and the like in the case of low use and a stuck switch). Thereafter, data related to machines 10 use may be downloaded (vend counts, dollars collected, and the like). Tamper/fault and error are again searched for before data is readied for transfer to a reader 16. After display, printing or other transmission of downloaded data, all histories and counts since the last collection are reset, the date of the download is set as the new SLC date, the system is again checked for tamper/fault or error, and the normal collection cycle is completed.

It should be noted, that microprocessor 65 keeps a number of counts related to the accumulated, verified vend cycles noted by the system. Counts of vends since the last collection and historically (all vends since placement of the particular machine 10) are maintained, only the SLC count being reset after each normal collection. These counts maintained by microprocessor 65 are also converted in system to collected dollar amounts (both since the last collection and historically, only the former being reset after each collection routine).

If a tamper/fault flag is noted, the tamper subroutine must be entered. Any time a tamper flag is set, microprocessor 65 will disallow communication with a reader 16 until an unlock code is entered. This code may only be accessed from an owner/operator central authority, and thus forces field personnel to contact the owner/operator of the machine to get the code, thereby alerting the owner/operator to the problem (including the potential for unauthorized machine entry and the like). Entry of time and date of the code indicia is held at microprocessor 65, and thereafter normal operation is resumed.

While not illustrated, it should be noted that various other functions are accommodated in software by processor 65, and highly detailed vending data (times, dates, product levels, use intensity and use, error, access and other histories, for example) is maintained and reportable. As may be appreciated, this invention greatly enhances heretofore known record keeping and security maintenance capabilities as related to bulk vending machines and machine arrays.

What is claimed is:

1. An apparatus for monitoring sales by a bulk vending machine, the machine having a coin shuttle connected to a rotatable shaft, said apparatus comprising:

a cam having a single cam lobe thereat and connectable at the shaft for rotation therewith;

first and second switches fixedly positionable relative to said cam so that said switches are spaced angularly apart a distance greater than maximum backlash allowed at the coin shuttle and for contact by said cam lobe during rotation thereof; and means for establishing signal communication from each of said first and second switches independently to thereby allow monitoring of the open and closed states thereof, whereby a verified vend at the bulk vending machine is only indicated upon monitored actuation of each of said switches in order responsive to contact by said cam lobe.

2. The apparatus of claim 1 wherein said switches are biased open and are normally closed only while in contact with said cam lobe.

3. The apparatus of claim 1 wherein said switches are mounted on an adapter co-axially locatable around the shaft.

4. The apparatus of claim 1 further comprising a microprocessor in communication with said means for establishing signal communication, said microprocessor for counting and storing vend date including verified vends responsive to signals from each of said first and second switches.

5. The apparatus of claim 4 further comprising a portable reader for downloading and storing said vend data from said microprocessor.

6. The apparatus of claim 4 further comprising at least a first tamper circuit at said microprocessor for detecting unauthorized operations relative to said apparatus and providing signals indicative thereof.

7. A bulk vending machine sales monitoring apparatus comprising:

a shaft mountable cam having only a single lobe thereat;

an adapter/sensor positionable in the bulk vending machine and including a mounting surface having a shaft accommodating opening located therein, a vend switch and clear switch each biased open and located at said mounting surface adjacent to said opening so that contact of said vend switch followed by contact of said clear switch by said lobe of said cam is assured during normal cam rotation to thereby selectively close said switches upon lobe contact, and an output interface located at said mounting surface and connected with each of said switches, said output interface providing separate signal output nodes for said vend switch and said clear switch; and a processing unit for receiving output from said separate signal output nodes and responsive thereto determining and verifying the occurrence of a valid vend at a bulk vending machine having said apparatus installed therewith based on activity first at said vend switch followed by activity at said clear switch.

8. The apparatus of claim 7 wherein said adapter/sensor mounting surface is established by a circuit board substrate attachable to structure in the bulk vending machine.

9. The apparatus of claim 7 wherein said adapter/sensor includes a tampering circuit at said surface thereof for detecting tampering or circuit fault at said adapter/sensor, said output interface providing a third separate signal output node connected with said tampering circuit, and wherein said processing unit includes a microprocessor and a first tamper circuit for receiving signal output from said tampering circuit output node and responsive thereto setting a flag at said microprocessor when a tampering or fault event is indicated.

10. The apparatus of claim 9 wherein said processing unit is housed in a case, and wherein said processing unit includes a second tamper circuit connected with said microprocessor and including a switch at said case activated when said case is opened to thereby set a flag at said microprocessor.

11. The apparatus of claim 7 wherein said processing unit includes a microprocessor connected to receive signals indicative of said output from said separate signal output nodes of said output interface of said adapter/sensor, said microprocessor connected with a data request and data output interface port for communication with a reader.

12. The apparatus of claim 11 wherein said port of said processing unit is adapted for a hand held computer and wherein said processing unit includes a microprocessor signal interface between said microprocessor and said port adapted to conform logic levels therebetween, said processing unit including a power supply providing separate high power output for said microprocessor signal interface and low power output for said microprocessor.

13. The apparatus of claim 7 wherein said processing unit includes an input interface having plural input ports for receiving signals indicative of said output from said separate signal output nodes of said output interface of plural said adapter/sensors each located at a different one of plural bulk vending machines.

14. The apparatus of claim 13 wherein said processing unit includes a microprocessor connected to receive digital output signals corresponding to said signals indicative of output received at said plural input ports of said input interface, a network ID connected with said microprocessor for identifying the number of said adapter/sensors communicating with said processing unit, and means for selectively switching at least some of said digital output signals responsive to microprocessor control.

15. A method for monitoring sales transactions of a bulk vending machine having a rotatable shaft extending radially from a coin shuttle, said method comprising the steps of:

positioning a cam having a single cam lobe thereat on the shaft;

locating first and second switches fixedly relative to said cam for contact thereof by said cam lobe upon rotation thereof, and positioning said switches relative to one another so that maximum normal backlash of said coin mechanism is less than angular spread of said switches; and communicatingly connecting said first and second switches for output of signals therefrom independently of one another.

16. The method of claim 15 further comprising processing said signals from said first and second switches to provide an indication of a verified vend at the bulk vending machine based on activity at said first switch followed by activity at said second switch.

17. The method of claim 15 further comprising the steps of:

rotating said cam whereby said cam lobe contacts and closes said first switch and monitoring signals from said first switch indicative of said first switch closure;

continuing to rotate said cam while continuing to monitor said signals from said first switch for a first period of time to verify closed status of said first switch;

continuing to rotate said cam and monitor signals from said first switch until said cam lobe rotates out of contact with said first switch and said first switch thereby opens providing signals from said first switch indicative of switch opening;

continuing to rotate said cam whereby said cam lobe contacts and closes said second switch and monitoring signals from said second switch indicative of said second switch closure; and continuing to rotate said cam while continuing to monitor said signals from said second switch for a second period of time to verify closed status of said second switch, and thereby verifying the occurrence of a completed vend by the vending machine.

18. The method of claim 17 further comprising continuing to rotate said cam and monitor signals from said second switch until said cam lobe rotates out of contact with said second switch and said second switch thereby opens providing signals from said second switch indicative of switch opening and thereby readying for another vend cycle.

19. The method of claim 17 further comprising the steps of:

monitoring said signals at a microprocessor;

communicatingly connecting a portable reader to said microprocessor;

entering appropriate initialization data into said portable reader;

entering appropriate transmission commands; and downloading and storing vend data contained in said microprocessor including a count of verified occurrences of completed vends over a selected time period.

20. The method of claim 15 further comprising detecting selected unauthorized operations related to said bulk vending machine or its operation, and upon such detection providing an output indicative thereof.

21. A method for monitoring sales related activity of a bulk vending machine comprising the steps of:

receiving a first signal indicative of a first phase of a vend cycle invoked at a monitored bulk vending machine;

receiving an unrelated separate first signal indicative of a second phase of the vend cycle;

distinguishing between actual signals indicative of said first and second phases and erroneous signals; and irrespective of additional signals received, acknowledging a verified vend during the vend cycle only after receipt of said first signal indicative of a first phase followed by said separate first signal indicative of a second phase, thereafter resetting in preparation for another vend cycle.

22. The method of claim 21 further comprising providing indicia of non-responsiveness when an actual said first signal indicative of a first phase is not followed by an actual said separate first signal indicative of a second phase or when an actual said separate first signal indicative of a second phase is persistent thereby preventing resetting.

23. The method of claim 21 further comprising accumulating counts of acknowledged verified vends over a bulk vending machine's lifetime and over a selected shorter period.

24. The method of claim 23 further comprising utilizing at least one of said counts as raw data and for conversion of said at least one of said counts to currency equivalents.

25. The method of claim 21 further comprising storing indicia of acknowledged verified vends in memory.

26. The method of claim 25 further comprising accommodating download from memory of vend data including accumulated acknowledged verified vends over a selected period.

27. The method of claim 26 further comprising receiving tamper/fault signals indicative of unauthorized events related to operation of the bulk vending machine and, responsive thereto, disallowing download from memory of said vend data without special authorization input.

28. The method of claim 21 wherein the step of receiving said first signal indicative of a first phase and said separate first signal indicative of a second phase comprises:

mounting a vend switch and a clear switch at selected locations at an adapter/sensor;

mounting a cam having a single lobe on the monitored bulk vending machine's rotatable shaft connected to operate a related coin shuttle of the monitored bulk vending machine;

placing said adapter/sensor adjacent to the shaft of the monitored bulk vending machine so that each of said switches is located to allow contact by said lobe of said cam during normal cam rotation to thereby selectively close said switches upon lobe contact and so that said switches are relatively angularly located with said vend switch at a position corresponding to said first phase and with said clear switch located at a position corresponding to said second phase; and providing separate signal outputs for said vend switch and said clear switch, a signal output from said vend switch corresponding to said first signal indicative of a first phase and a signal output from said clear switch corresponding to said separate first signal indicative of a second phase.

29. The method of claim 21 further comprising monitoring and recording in memory periods of non-use of the monitored bulk vending machine.

30. The method of claim 21 further comprising receiving first signals indicative of a first phase of a vend cycle and unrelated separate first signals indicative of a second phase of the vend cycle from a plurality of different monitored bulk vending machines at a processing unit adapted thereto, and distinguishing between actual and erroneous signals and acknowledging verified vends for each of said monitored bulk vending machines at said processing unit.

* * * * *

UNITED STATES PATENT AND TRADEMARK OFFICE
CERTIFICATE OF CORRECTION

PATENT NO. : 6,986,416 B1
DATED : January 17, 2006
INVENTOR(S) : Christopher E. Adams It is certified that error appears in the above-identified patent and that said Letters Patent is hereby corrected as shown below:

Column 6,
Line 50, "orient d" should be -- oriented --;

Column 9,
Line 26, "th particular" should be -- the particular --;

Column 11,
Line 59, "PAIM" should be -- PALM --.

Signed and Sealed this

Fourteenth Day of March, 2006

JON W. DUDAS
*Director of the United States Patent and Trademark Office*